United States Patent [19]

Caser

[11] 4,029,450
[45] June 14, 1977

[54] PLANT FOR VULCANIZING A CONTINUOUS LENGTH OF CURABLE MATERIAL ARTICLES OF ELASTOMERIC MATERIALS

[75] Inventor: Gustavo Caser, Gaglianico (Vercelli), Italy

[73] Assignee: Officine Termomeccaniche Successori Carello S.p.A., Gaglianico, Italy

[22] Filed: Apr. 18, 1975

[21] Appl. No.: 569,502

[30] Foreign Application Priority Data

Apr. 26, 1974  Italy ................. 68315/74

[52] U.S. Cl. .................... 425/71; 264/347; 425/72 R; 425/113; 425/404; 425/445
[51] Int. Cl.² ..................................... B29F 3/10
[58] Field of Search ...... 165/65; 264/176 R, 178 R, 264/178 F, 85, 347; 425/70, 71, 72, 113, 114, 377, 378, 379, 384, 392, 404, 445; 92/83

[56] References Cited

UNITED STATES PATENTS

| | | |
|---|---|---|
| 2,561,820 | 7/1951 | Ramsey et al. ............... 425/135 X |
| 2,837,764 | 6/1958 | Hallam et al. ................ 425/71 X |
| 3,295,163 | 1/1967 | Bachus ......................... 425/404 X |
| 3,497,913 | 3/1970 | Gallant ......................... 425/113 X |
| 3,901,633 | 8/1975 | Chrisman et al. ............... 425/72 |
| 3,924,985 | 12/1975 | Betts et al. .................... 425/445 X |

*Primary Examiner*—Francis S. Husar
*Assistant Examiner*—Mark Rosenbaum
*Attorney, Agent, or Firm*—Ladas, Parry, Von Gehr, Goldsmith & Deschamps

[57] ABSTRACT

A plant for carrying out a process of continuous vulcanization of articles of elastomeric material comprises a vulcanization apparatus comprising a circuit for a heat exchange liquid. The circuit comprises a vulcanization chamber arranged to receive the heat exchange liquid, means for heating the liquid to a predetermined temperature, and means for generating a predetermined pressure in the circuit. The circuit has at least one inlet and one outlet to allow passage of articles through the chamber, seals disposed at the inlet and outlet to ensure tightness of the passage of articles through the inlet and outlet and means to prevent contact between the seals and the high temperature liquid contained under pressure within the circuit.

27 Claims, 14 Drawing Figures

PLANT FOR VULCANIZING A CONTINUOUS LENGTH OF CURABLE MATERIAL ARTICLES OF ELASTOMERIC MATERIALS

The present invention relates to a plant for the continuous vulcanization of articles of elastomeric materials, said articles consisting, generally, of drawn and molded compact and foamed articles, calendered sheets and, in particular, cable insulating coatings extruded directly on the cables.

In particular the present invention relates to a continuous vulcanization process of the type called "LCM" (Liquid Curing Medium), i.e. of the type which includes a stage consisting in advancing the articles to be vulcanized along a vulcanization chamber containing a heat exchange liquid maintained at a substantially constant temperature, said liquid having a substantially stable liquid phase within a range of temperatures comprised at least between 150° and 300° C.

The elastomeric materials which are most commonly vulcanized by known LCM processes are, generally, those used most commonly for the production of drawn articles, i.e. natural rubber, SDR, polychloroprene, nitrile rubbers, etereo-elastomers (polyisoprene and polybutadiene 1,4 cis) ethylene-propylene mixtures and the like.

In said known LCM processes, the heat exchange liquid consists, generally, of eutectic mixtures of inorganic salts, such as for example sodium and potassium nitrates and sodium nitrite, said mixtures being, generally, stable in liquid phase in a range of temperatures from 150° and 400° C.

For carrying out the known LCM processes it is a general practice to use elongated open top tanks provided with heater elements and filled with said heat exchange liquid. Generally, the articles to be vulcanized are caused to advance along said tank by means of a conveyor belt which is mounted so as to press on said article and maintain it immersed in said liquid.

The structural characteristic which can more easily be found in the elastomeric material articles vulcanized by known LCM processes consists generally in a high porosity of bubbling which is due to the presence of gas, moisture and/or volatile products in the mix or blend of elastomeric materials to be vulcanized. Said porosity or bubbling of the vulcanized elastomeric materials may sometimes be a desired structural characteristic aimed at on purpose, and sometimes a disadvantage to be avoided at all costs or at least reduced drastically. This latter case is, for instance, the case of the electric cables coated with a vulcanized elastomeric material in which even a low porosity in the interior of the elastomeric material, which in this case acts as insulating material, drastically reduces the dielectric strength of the insulation. When it is necessary to avoid wholly or partially the porosity of the elastomeric material, a dehydrating agent is, generally, added to the mixture of the elastomeric material to be vulcanized. As dehydrating agent is employed, normally, an active calcium oxide, predispersed in mineral oil or in waxes, which preferably is added to the mixture at temperatures comprised between 80° and 100° C and as the last ingredient. The calcium oxide reacts chemically with the moisture, thereby preventing the formation of bubbles in the interior of the vulcanized material. However, it is to be taken into account that the calcium oxide affects adversely the physical characteristics of the vulcanized materials. Therefore, in the preparation of the mixtures and in their formulation it is necessary to make provisions which tend to limit the use and/or the adverse action of the calcium oxide, said provisions consisting, generally, in a reduction of the percentage of moisture in the mixtures, said reduction being obtained, for example, by working the mixtures at high temperatures, and/or by utilizing ingredients containing a low percentage of moisture, and/or by using vacuum extruders, and/or by introducing zinc oxide into the mixtures.

In order to eliminate the porosity or bubbling in the vulcanized materials and to avoid the disadvantages, both technical and economical, connected with the provisions hitherto made to obtain said purpose, the process of continuous vulcanization which forms the object of the present invention, and which is of the LCM type described hereinabove, comprises the further step consisting in submitting the articles to be vulcanized, at least in the interior of the vulcanization chamber and at least for all the time during which said articles are made to advance, in contact with the heat exchange liquid, along said chamber, to a pressure of a determined value independent of the temperature of said liquid.

By maintaining the pressure to which the articles which have to be vulcanized are submitted, and hence the pressure of the heat exchange liquid, at a level higher than that attained, at the temperature of the liquid, by the pressure of the steam and/or of the gases eventually present in the mixture of elastomeric material which has to be vulcanized, it is possible to reduce practically to zero the porosity or bubbling of the vulcanized elastomeric materials.

In order to fix the structure of the elastomeric material articles vulcanized by the process described hereinabove, and to eliminate the danger of formation of a certain porosity or bubbling in said articles during the cooling of the same, the process of the present invention preferably comprises the further step consisting in that the vulcanized articles of elastomeric material are cooled, starting from the vulcanization temperature, and, during the cooling, submitted to a determined pressure, said pressure being preferably substantially equal to the vulcanization pressure.

The present invention relates also to a plant for carrying out the vulcanization process according to the invention, said plant including a vulcanization apparatus comprising a circuit for a heat exchange liquid, said circuit comprising a vulcanization chamber arranged to receive a heat exchange liquid, means for heating said liquid to a determined temperature, means for generating, in the interior of said circuit, a determined pressure, at least one inlet and one outlet in said circuit to allow the passage of said articles through said chamber, seals disposed on said inlet and said outlet to ensure the tightness of the passage of said articles through said inlet and said outlet, and means to prevent the contact between said seals and the liquid under pressure and at high temperature contained within said circuit.

Other characteristics and advantages of the present invention will become apparent from the following specification with reference to the accompanying drawings which represent some non limitative embodiments of the invention and in which.

Figure 1:
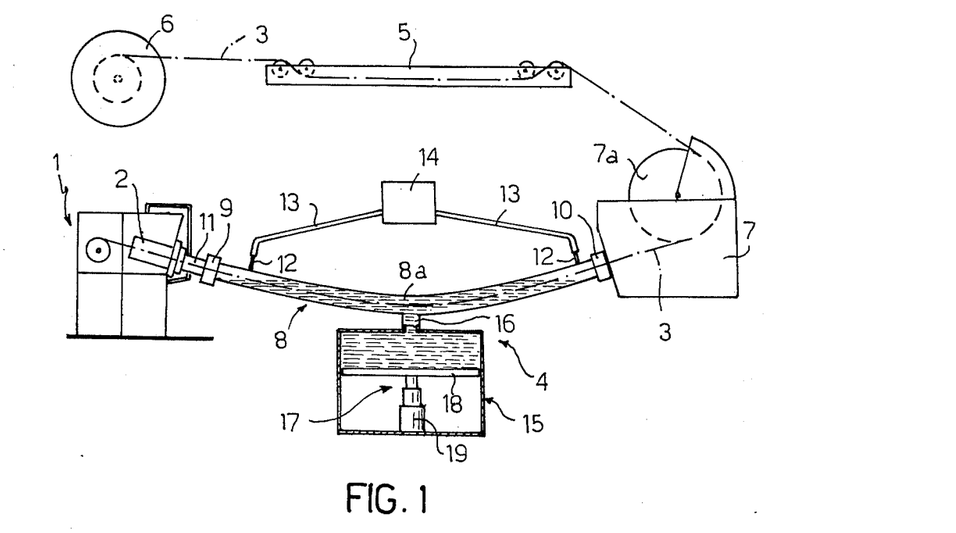
FIG. 1 shows diagrammatically a first plant of continuous vulcanization according to the invention.
Figure 3:
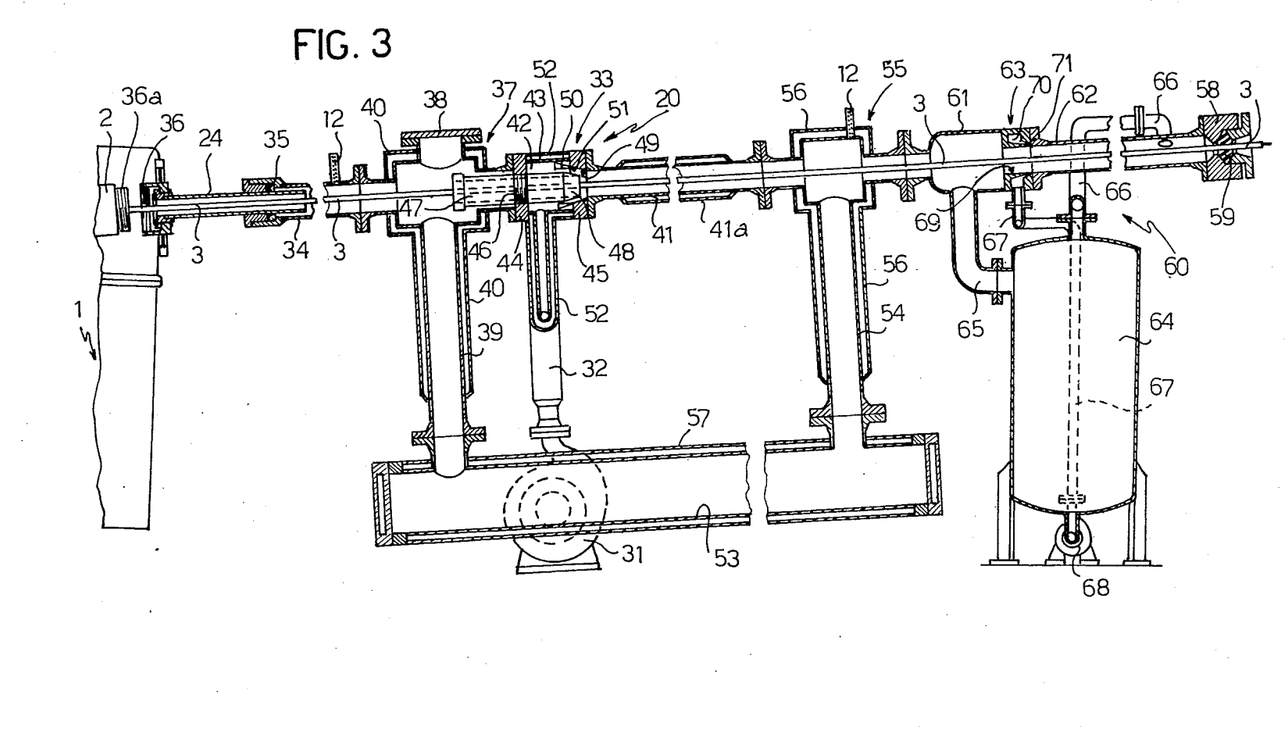
FIG. 3 is a diagrammatical sectional view of a particular embodiment of a part of the plant shown in FIG. 2.

The plants shown in FIGS. 1 and 3 are intended to be utilized preferably, but not exclusively, for the production of extruded articles of elastomeric material provided with a metal core, for instance electric cables provided with an insulating coating.

The plant shown in FIG. 1 is formed substantially by a drawing machine, indicated generally by reference numeral 1, comprising an extruder or extension head 2, through which extends the cable 3 which has to be coated. Cable 3 coming out from the extruder 2 is coated with a cylindrical layer of elastomeric material in a substantially crude condition and penetrates into the interior of an apparatus of continuous vulcanization, indicated generally by reference numeral 4, from which it comes out to successively pass through a washing tank 5 and to be wound on a drum 6. The latter, generally, is motorized in order to exert a determined drawing action on the cable 3 so as to make it move at a substantially constant speed through the extruder 2, the vulcanization apparatus 4 and the washing tank 5. In the embodiment shown in FIG. 1, the cable 3, before reaching the washing tank 5, passes through a cooling tank 7 provided with a transmission drum 7a.

The vulcanization apparatus 4, which may be defined as "a static bath continuous vulcanization apparatus", is constituted substantially by a circuit for a heat exchange liquid, said circuit comprising a vulcanization chamber or tank 8 which in the particular case shown is defined by a pipe 8a. The latter, in the example shown in FIG. 1, presents a bent axis lying in a vertical plane and with the concavity facing upwards.

Conversely, according to an embodiment not shown, the pipe 8a presents a substantially U-shaped axis and comprises two vertical arms radiused by a central bent portion with the concavity facing upwards.

Pipe 8a presents an inlet end 9 and an outlet end 10 for the cable 3. The inlet end 9 is disposed facing the extruder 2 and is connected to the latter by means of tubular element 11 mounted slidably and in a tight manner inside the inlet end 9 of the pipe 8a and connected, at one end, detachably and in sealing manner, to the extruder 2. Pipe 8a is provided, in proximity to each of its ends 9 and 10, with a tubular appendix 12 which communicates with the interior of the pipe 8a and is connected, by means of a respective conduit 13, to a pressurized gas distributor 14. In addition to the pipe 8a, said circuit for said heat exchange liquid comprises a tank 15 connected to a central portion of the pipe 8a by means of a conduit 16. Mounted within the tank 15 is a lifting device 17 which, in the example shown in FIG. 1, consists of a plunger 18 mounted slidably and in a sealing manner in the interior of the tank 15 and operated by a hydraulic cylinder 19; of course, however, the lifting device 17 may be constituted by any device capable of lifting the liquid contained within the tank 15 so as to flood, at least partially, the vulcanization chamber 8. The heat exchange liquid contained in said circuit formed by chamber 8, tank 15 and conduit 16, is preferably constituted by a mixture of inorganic salts maintained in liquid phase by a heating system (not shown) which extends substantially over the whole surface of said circuit 8, 15, 16.

In use, at the beginning of the working cycle, the heat exchange liquid is contained within the tank 15, in the interior of which the hydraulic cylinder 19 has been completely lowered in order to lower the piston 18 and to allow said liquid to be received in the tank 15. By means of the heating system, the liquid contained in the tank 15 is heated up to a determined temperature comprised, generally, between 150° and 300° C. The metallic cable 3 is then made to pass through extruder 2 and through pipe 8a and is successively wound around the drum 7a of the cooling tank 7 and connected to the drum 6 through the washing tank 5. During this assembly step, the tubular element 11 is maintained inserted telescopically into the end 9 of the pipe 8a in order to provide a window for checking the position of the cable 3. The latter will dispose itself along the axis of the pipe 8a according to a common catenary which substantially coincides with the axis of the pipe 8a and is a function of the traction imparted to the cable 3 by the drum 6. At this point, the extruder assembly 1 will be operated, so that the cable 3 will start moving through the extruder 2 and at the same time will be coated with a tubular layer of elastomeric material in a crude condition. After having ascertained that the cable 3 is perfectly centered with respect to its insulating sheath, the tubular element 11 is withdrawn from the inlet end 9 of the pipe 8a and connected to the head of the extruder 2.

According to what is shown in FIG. 1, the cylinder 19 is then lifted so as to cause the heat exchange liquid to flood completely the intermediate portion of the pipe 8a, and in such a way that, in proximity to the inlet and outlet ends 9 and 10 of the pipe 8a, the liquid forms two free surfaces or meniscuses disposed at a certain distance from and beneath said ends 9 and 10. Circuit 8, 15, 16 is then pressurized by introducing a gas under pressure into the interior of chamber 8 through the tubular appendixes 12. The introduction of compressed gas into the chamber 8 gives rise to the formation of two compressed gas pockets, the first of which is situated within the chamber 8 between the orifice of the extruder 2 and the nearest of the two meniscuses, whilst the other pocket is defined, inside the chamber 8, by the other of said meniscuses and a seal (not shown) arranged within the outlet end 10 and formed, generally, by a ring of resilient material provided with one or more annular lips disposed in contact with the outer surface of the coating of the cable 3.

It is important to note that the bent configuration of the pipe 8a allows the formation of the two compressed gas pockets, which keep both the inlet seal of chamber 8, constituted by the orifice of extruder 2, occluded by the coated cable 3, and the outlet seal of chamber 8, which seal is constituted by the foresaid annular seal situated inside the outlet end 10 of the pipe 8a separate from the heat exchange liquid. The drum 6 is then operated so as to exert a traction on the cable 3 which slides along the pipe 8a passing through the heat exchange liquid which floods the central portion of said pipe 8a. During the passage through the liquid, the elastomeric materials which coats the cable 3 vulcanize so that the vulcanized coating, already hardened, passes without damage through the seal situated in the outlet end 10 and reaches the washing tank 5 through the cooling tank 7. By adjusting the pressure imparted by the compressed gas to the heat exchange liquid it is possible to reduce practically to zero the porosity or bubbling of the vulcanized elastomeric material which constitutes the insulating sheath of the cable 3.

As pointed out previously, the presence of the tank 15 with the respective conduit 16 connecting said tank to the pipe 8a, and of the lifting device 17, is justified by the convenience of being able to completely discharge the liquid from the chamber 8 both during the insertion of the cable 3 through the vulcanization apparatus, and for effecting periodical controls. It is clear, however, that as regards the continuous vulcanization in a static bath of articles of elastomeric material, the tank 15 could be eliminated, and with it also the lifting device 17. In this case, the circuit previously indicated by 8, 15, 16, would be formed only by the tank 8, in the interior of which the liquid would always be present.

Figure 2:
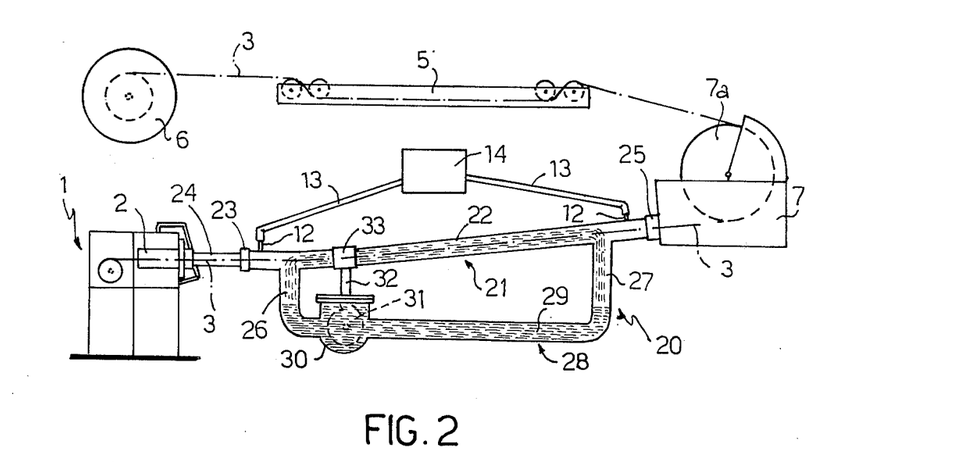
FIG. 2 shows diagrammatically a second plant of continuous vulcanization according to the invention.

The plant shown in FIG. 2 may be defined as a "dynamic bath continuous vulcanization apparatus" and also comprises an extruder assembly 1 provided with an extruder or extruder head 2 for the extrusion of an insulating tubular sheath on a cable 3, said sheath being formed from a substantially crude elastomeric material at the moment of its coming out from the extruder 2. In order to vulcanize the elastomeric material forming said sheath, the plant shown in FIG. 2 comprises a vulcanization apparatus 20, through which the coated cable 3 extends. At the outlet of the apparatus 20, the vulcanized cable 3 is made to pass through a cooling tank 7 and transported, by means of a transmission drum 7a, to a washing tank 5, from which it comes out to be wound on a drum 6 able to impart to the cable a determined drawing action. Analogously to the apparatus 4, also the apparatus 20 is formed substantially by a circuit for a heat exchange liquid, said circuit comprising a vulcanization chamber or tank 21 which, in the embodiment shown, is defined in the interior of a pipe 22 whose axis is substantially rectilinear and slightly slanting upwards. The pipe 22 has an inlet end 23, within which there is mounted a telescopically slidable tubular element 24 whose free end is connected, in a detachable manner, to the head of the extruder 2. The pipe 22 also has an outlet end 25, within which there is mounted an annular sealing gasket (not shown) which is able to provide a sliding seal with the outer surface of the insulating sheath of the cable 3. The pipe 22 is provided, in proximity to each of the two ends 23 and 25, with a tubular appendix 12 which communicates with the chamber 21 and is connected to a corresponding conduit 13 connected a compressed gas distributor 14. Said circuit for the heat exchange liquid comprises, in addition to the pipe 22, a U-shaped conduit 28 comprising a central portion 29 and two end portions 26 and 27 connected to the pipe 22 adjacent the ends 23 and 25 of the latter, respectively. The central portion 29 of the conduit 28 comprises a vessel 30, in the interior of which there is mounted a pump 31. The output of the pump 31 is connected, through a conduit 32, to an injection device 33 inserted into the pipe 22 to allow the liquid flowing along the conduit 32 to penetrate into the interior of the pipe 22 itself.

The amount of heat exchange liquid contained within the vulcanization apparatus 20 for providing the vulcanization bath is such as to leave the pipe 22 completely free of heat exchange liquid when pump 31 is not operating.

In use, the liquid contained in the conduit 28 and in vessel 30 is heated up to a determined temperature. At the same time, the cable 3 is mounted through the extruder 2 and the pipe 22 according to the technique described hereinabove for the assembly of the cable 3 in the plant shown in FIG. 1. After having effected all the controls and closed the tubular element 24 against the head of the extruder 2, compressed gas is delivered by the distributor 14, through the pipes 13 and the appendixes 12, so as to occupy the whole part of the vulcanization apparatus 20 which is free from the heat exchange liquid. At this point, the pump 31 is operated so as to supply the heat exchange liquid to the injection device 33 within the pipe 22. Preferably, the injection device 33 and the pump 31 are such that the jet of liquid coming out from the injection device 33 floods completely the portion of the pipe 22 which is situated downstream the injection device 33 and is comprised between the latter and end portion 27 of the conduit 28. After having reached said end portion 27, the liquid precipitates into the interior of the conduit 28 and flows back to the vessel 30 and then to the pump 31 for being recycled. Since the cable 3 extends all along the pipe 22, the injection device 33 must be formed so as to allow the passage of the cable 3. Accordingly, since at the moment of the passage through the injection device 33 the elastomeric material which coats the cable 3 is still partially crude and, therefore, soft, it is not possible to mount a seal on the injection device 33. Consequently, a part of the liquid injected into the pipe 22 by the injection device 33 flows back, through the latter, towards the end portion 26 of the conduit 28, within which it precipitates to come back to the interior of the vessel 30 and then to the pump 31.

It is important to note that, analogously to what has been described with reference to the plant shown in FIG. 1, also in the case of the plant of FIG. 2 the inlet and outlet seals of chamber 21, the first of which is formed by the orifice of the extruder 2 occluded by the coated cable 3, and the second is formed by the annular seal situated within the outlet end 25 of the pipe 22, are kept always insulated from the heat exchange liquid. In the case of the plant of FIG. 2, said insulation is ensured by the presence of the end portions 26 and 27 of the pipe 28, into which end portions the heat exchange liquid precipitates before coming into contact with said seals. The compressed gas delivered by the distributor 14 through the pipes 13 and the tubular appendixes 12 compresses the liquid contained in the circuit 22, 28, so as to allow a vulcanization under pressure, and at the desired pressure, of the elastomeric material which coats the cable 3.

A particular embodiment of the vulcanization apparatus 20 shown in FIG. 2 is represented diagrammatically in a sectional view in FIG. 3.

The vulcanization apparatus 20 shown in FIG. 3 comprises, at its top portion, a first tubular element 34 which faces the extruder 2 and carries in its interior the tubular element 24. The latter is mounted to be telescopically slidable within the tubular element 34, which is provided internally with a sliding seal 35 cooperating with the outer surface of the tubular element 24. The tubular element 24 is provided, at its end facing said extruder 2, with an internally threaded head 36 arranged to be coupled with an externally threaded end 36a of the extruder 2. The tubular element 34 carries, radially connected to it, one of the tubular appendixes 12 and is detachably connected, by means of a coaxial tubular union, to a collector 37. The latter is formed by a hollow body provided, on its upper part, with a cover 38 which can be opened and is connected, on its lower part, to a conduit 39 extending downwards. Collector 37 and conduit 39 are provided with an external skirt 40 which defines a gap within which there is disposed heating means.

A tubular union, coaxial to the tubular element 34, connects the collector 37 to the injection device 33 which in turn is connected to a tubular vessel 41 coaxial to the tubular element 34 and provided externally with a skirt 41a defining a gap, inside which there are mounted heating means.

The injection device 33 shown in FIG. 3 comprises a substantially cylindrical chamber 42 coaxial to the tubular element 34, which chamber is defined by a cylindrical sidewall 43, a first bottom wall 44 facing the collector 37, and a second bottom wall 45 facing the tubular container 41. The bottom wall 44 is provided centrally with a threaded through hole 46 into which is screwed a tubular body 47 which extends, on one hand, until it penetrates into the collector 37, and on the other hand, through the whole chamber 42, till it penetrates, with a frusto-conical end portion 48, into a trunco-conical axial hole 49 formed in the bottom wall 45. The end portion 48 of the tubular body 47 defines, within the whole 49, an annular passage 51, configurated as a Venturi tube, whose port is adjustable by screwing more or less deeply the tubular body 47 into the threaded through hole 46. Extending from the sidewall 43 in contact with the bottom wall 45, are radial tabs 50 which extend almost into contact with the outer surface of the tubular body 47, said radial tabs serving to ensure an axial movement of the liquid along the annular passage 51. Chamber 42 communicates radially with a conduit 32 which in turn communicates with the pump 31. Both the chamber 42 and the conduit 32 are coated with an external skirt 52 defining a gap, within which there are disposed heating means.

Pump 31 is connected to a vessel 53 elongated in shape, which communicates, on one hand, with the lower end of the conduit 39 and on the other hand with the lower end of a conduit 54 which extends downwards from a collector 55 constituted by a hollow body coaxial to the tubular container 41 and connected to the end of the latter which is opposed to that connected to the injection device 33.

Conduit 54 and collector 55 are coated with a skirt 56 defining a heating gap. A similar skirt 57 surrounds the vessel 53, and also this skirt defines a gap containing heating means therein.

Connected to the collector 55 is the second of the tubular appendixes 12, the collector 55 being connected, through a cooling device 60, to an outlet head 58 within which there is detachably mounted an annular gasket 59 defining an axial hole through which extends in a sealing manner the cable 3 coated with vulcanized elastomeric material.

The cooling device 60 comprises a collector 61 communicating axially, on one hand, with the collector 55 and on the other hand with a cooling chamber defined within a tubular container 62 connected, on one hand, to the collector 61 through an injection device 63, and, on the other hand, to the output head 58. The cooling device 60 comprises also a vessel 64 for the cooling fluid, the vessel 64 being disposed beneath the container 62 and being connected both to collector 61, through a conduit 65 extending radially downwards from the connector 61 and connected to the upper end of the vessel 64, and to container 62 through a conduit 66 extending radially from the container 62 in proximity to the head 55 and also connected to the upper end of the vessel 64. The latter is connected also to the injection device 63 by means of a conduit 67 extending from the lower end of vessel 64 and comprising a pump 68.

The injection device 63 is formed by an annular element provided with an axial through hole 69 which connects container 62 to collector 61. Said annular element presents internally an annular chamber 70 which communicates radially with one end of conduit 67 and presents an axial annular slit 71 through which it communicates with the container 62. The slit 71 is tapered in cross-section towards the container 62 and is defined by coaxial annular surfaces which are frustoconical in shape and define an annular nozzle arranged to direct into the interior of the container 62 a conical jet whose axis coincides with that of the container 62. Naturally, the slit 71 may be substituted by a plurality of frusto-conical holes distributed uniformly along the chamber 70 and extending along generatrixes of a cone coaxial to the container 62 and having its apex facing the head 58.

In use, after the cable 3 has been assembled through tubular elements 24 and 34, collector 37, annular body 47 of the injection device 33, tubular container 41, collector 55, cooling device 60 and gasket 59 of the output head 58, and after the tubular element 24 has been connected to the extruder 2, pump 31 is operated so as to feed the heat exchange liquid into the chamber 42. Having reached this point, the heat exchange liquid penetrates into the interior of the annular passage 51 configurated as a Venturi tube, after having been stabilized directionally by the tabs 50. Coming out under pressure from the annular passge 51, the liquid forms a substantially hollow cone, in front of the free end of the end portion 48 of the tubular body 47, before converging onto the cable 3 and before filling the container 41 up to its end connected to the collector 55. The length of the hollow cone formed in front of the end portion 48 of the tubular body 47 is, at equal capacity of the pump 31, a function of the adjustable cross-section of the annular passage 51.

After having reached the interior of the collector 55, the heat exchange liquid flows into the vessel 53 through conduit 54. In spite of the formation of said empty cone in front of the end portion 48 of the tubular body 47, some of the liquid can penetrate, assisted in this by the inclination of the container 41, into the interior of the tubular body 47, which liquid in this case precipitates into the vessel 53 through the conduit 39. Conversely, in case of a stopping of the pump 31, the whole liquid which is present in the container 41 precipitates into the vessel 53 through the conduit 39, thus completely emptying the container 41.

After the heat exchange liquid has been made to circulate as described hereinabove, compressed gas is introduced through the tubular appendixes 12 into the vulcanization apparatus 20, said compressed gas compressing the heat exchange liquid which is present in the vulcanization apparatus 20. In this way, the layer of extruded elastomeric material, which coats the portion of the cable 3 which is present at any moment within the container 41, is vulcanized at a determined pressure.

As said previously, in order to facilitate the filling of the container 41, this container is slightly sloped upwards beginning from the injection device 33. The slope of the container 41 depends on the circumstances and, for particular applications or for lack of space, the container 41 may be arranged vertically, said arrangement of the container 41 requiring only a higher pressure from the pump 31 and/or a particularly narrow annular passage 51 in order to prevent the liquid which penetrates into the container 41 from flowing back through the tubular body 47.

The injection device 33 shown in FIG. 3 is only a particularly efficient type of injection device. A possible variant (not shown) of the device 33 shown in the drawing may comprise, instead of the tubular body 47, one or more nozzles connected directly to the conduit 32, said nozzles being preferably arranged as a crown along the generatrixes of a cone coaxial to the cable 3, and being able to define a hollow cone able to prevent the heat exchange liquid from flowing back. In particular, the device 33 could be similar to the injection device 63 of the cooling device 60.

The cooling device 60 does not form an essential part of the vulcanization plant shown in FIG. 3, and could be dispensed with by connecting the head 58 directly to the collector 55. The function accomplished by the device 60 is, in fact, an auxiliary function aiming to eliminate the danger of the formation of small pockets or bubbles of volatile parts of the mixture of the vulcanized articles in case said articles are exposed, at a still high temperature, to the atmospheric pressure.

The device 60 eliminates said danger by cooling under pressure the vulcanized articles, in this case the cable 3, as they come out from the vulcanization chamber. To this end, within the vessel 64 there is disposed a cooling agent, preferably water, which is supplied, by means of the pump 68 and the conduit 67, to the chamber 70 of the injection device 63 and injected by the latter into the tubular container 62 to come back to the vessel 64 through the conduit 66.

The coated cable 3, passing through the liquid contained in the container 62, cools till it reaches a temperature at which the structure of the vulcanized elastomeric material which forms its coating results in being definitively fixed. In this way, there is no danger that the volatile materials contained in said coating may gather in bubbles, the formation of such bubbles being prevented, during the cooling, by the fact that in the interior of the cooling device 60 there is substantially the same pressure as in the vulcanization apparatus 20, the latter and the device 60 communicating with each another through a tubular union interposed between the collectors 55 and 61. Naturally, compressed gas could be pumped directly into the device 60, by providing the collector 61 with an appendix connecting said collector to a distributor of compressed gas.

In this case, by arranging a seal for the cable 3 within the tubular union connecting the collectors 55 and 61, it would be possible to feed the apparatus 20 and the device 60 with gas under different pressures.

The plants shown in FIGS. 1 and 2 are not provided with the cooling device 60, whose function, in this case, is accomplished by the tank 7, by means of which a very sudden cooling of the vulcanized articles is produced, said sudden cooling serving also, like the device 60, to avoid the danger of the formation of bubbles during the cooling stage. Obviously, the device 60 may be mounted on both plants shown in FIGS. 1 and 2 in addition, or as an alternative, to the cooling tank 7.

Starting from the general diagram of a vulcanization apparatus described in connection with the plants shown in FIGS. 2 and 3, it is possible to realize numerous variants.

According to a first variant not shown, the vulcanization apparatus comprises two opposed injection devices arranged at the opposed ends of the tubular container forming the vulcanization tank, the two injection devices being, in this case, fed simultaneously by the pump, and the heat exchange liquid flowing back to a lower collecting vessel, connected to the pump, through a return conduit connected to the central region of the vulcanization tank.

According to another variant not shown of the vulcanization of FIG. 3, said tubular container which serves as vulcanization tank may be disposed sloping downwards (and may also be vertical), the injection device being, in this case, arranged at the end of said tubular container which faces the outlet end of the vulcanization apparatus, and being oriented so as to supply the heat exchange liquid towards the extruder. The direction of circulation of the heat exchange liquid would then be inverted with respect to the direction shown in FIG. 3, with the result that the elastomeric material which coats the cable 3 is vulcanized in countercurrent.

According to a last variant of the vulcanization apparatus shown in FIGS. 2 and 3, the heat exchange liquid is fed in a rain-like manner into the vulcanization chamber.

Figure 4:
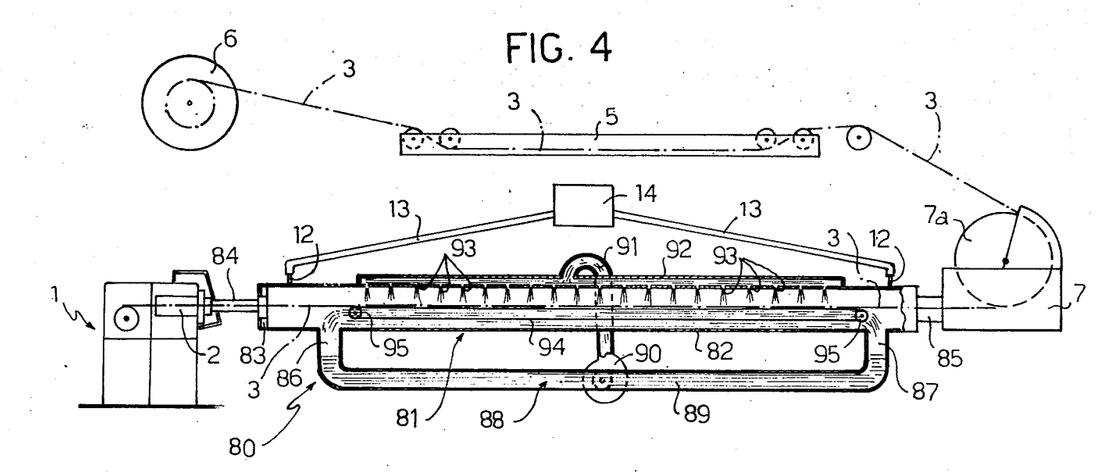
FIG. 4 shows diagrammatically a third continuous vulcanization plant according to the invention.

An example of a vulcanization apparatus of this type is shown in FIG. 4 in which there is represented diagrammatically a vulcanization plant similar to that of FIG. 2 and comprising also an extruder assembly 1 provided with an extruder or extrusion head 2 for a coated cable 3, a vulcanization apparatus indicated by reference numeral 80, a cooling tank 7 provided with a transmission drum 7a, a washing tank 5 and a drawing drum 6.

Analogously to the apparatus 20, the vulcanization apparatus 80 is substantially formed by a circuit for a heat exchange liquid, said circuit comprising a vulcanization chamber or tank 81 defined, in the embodiment shown, within a horizontal pipe 82. The latter presents an inlet end 83, within which there is arranged a telescopically slidable tubular element 84 connecting the pipe 82 to the extruder 2, and an outlet end 85 within which there is arranged a gasket (not shown) similar to the gasket 59 shown in FIG. 3.

In proximity to each of its ends the pipe 82 presents a radial appendix 12 communicating, through a respective conduit 13, with a compressed gas distributor 14.

The aforementioned circuit for the heat exchange liquid comprises, in addition to the pipe 82, a U-shaped conduit 88 comprising a central portion, formed by an elongated vessel 89, and two end portions 86 and 87 connected to the pipe 82 in proximity to the ends 23 and 25 of the latter, respectively. Connected to the vessel 89 is a pump 90 which in turn is connected, through a conduit 91, to a conduit 92 superposed on the central portion of the tube 82 and communicating with the latter through a plurality of nozzles 93 formed by holes spaced uniformly along the conduit 92.

According to the arrangement shown, the pipe 82 is sufficiently large to receive therein a belt conveyor 94. The latter advances together with the cable 3 and keeps it always perfectly exposed to the action of the liquid coming out from the nozzles 93. In this way, as the cable 3 advances along the pipe 82, a shower-like continuous vulcanization of the coating of the cable 3 is obtained, said vulcanization being accomplished at a certain determined pressure existing within the circuit 82, 88, 90, 91, 92 and 93, and said pressure being applied by means of the compressed gas distributor 14.

It is important to point out that the vulcanization apparatus 82, although described with reference to the vulcanization of coated electric cables, is particularly suitable for the continuous vulcanization of any extruded article of elastomeric material, even if not provided with a metallic core. As said extruded articles are generally lighter than the heat exchange liquid and therefore tend to float on it, the plants shown in FIGS. from 1 to 3, unless particular precautions are taken, are not suitable for the vulcanization of said extruded articles, since their vulcanization chambers generally are invaded, at least for a certain length, by the heat exchange liquid. Owing to this, said extruded articles without metallic core tend to come into contact with the walls of the vulcanization chamber, under the buoyancy exerted on them by the heat exchange liquid when said chamber is of the type with sloped or horizontal axis. Moreover, in the vulcanization plants represented in FIGS. 1 to 3, no support is provided, along the vulcanization chamber, for the articles to be vulcanized, so that these articles, if they are unprovided with a metallic core, may break under their own weight and/or under the traction of the drum 6. Conversely, in the case of the vulcanization apparatus 80 of FIG. 4, the conveyor belt 94 can not only support said extruded articles without metallic core, but also make them advance. Moreover, the upper run of the belt 94 may be arranged within the pipe 82 at a level higher than the maximum level reachable by the liquid within the pipe 82, so as to avoid floating of said extruded articles on the liquid.

As in the case of the apparatus 20, also in the apparatus 80 the contact between the inlet and outlet seals of the vulcanization chamber and the heat exchange liquid is prevented by the presence of the end portions 86 and 87 of the conduit 88 through which said liquid reaches the pump 90 for being recirculated.

Obviously, the embodiments described hereinabove are only non limitative examples, and numerous modifications can be applied to said embodiments without departing from the scope of the present invention.

I claim:

1. A plant for vulcanizing a continuous length of curable material, the plant comprising means defining a vulcanization chamber having a first region adapted to receive heat exchange liquid heated to a predetermined temperature, and at least one further region which communicates with said first region but is not invaded by said heat exchange liquid when said heat exchange liquid is received in said first region; fluid pressure means connected to said at least one further region to generate in said vulcanization chamber fluid pressure; and inlet means and outlet means provided at said at least one further region to allow passage of said material through said chamber in fluid tight manner.

2. A plant as claimed in claim 1, further comprising an extruder assembly for said material to be vulcanized, said extruder assembly facing said inlet means and being connectable thereto.

3. A plant as claimed in claim 2, wherein said vulcanization chamber is formed by an elongate conduit, said inlet means and said outlet means being arranged at opposite respective ends of said conduit and said first region of the chamber being constituted by a region of the conduit intermediate the ends thereof, said extruder assembly having an outlet orifice through which said material is extruded in fluid-tight manner, and the inlet end of said conduit being detachably connected in fluid tight manner to said extruder assembly at the outlet orifice thereof.

4. A plant as claimed in claim 1, wherein said fluid pressure means are means operatively associated with said chamber for feeding a gas under pressure into said chamber.

5. A plant as claimed in claim 1, further comprising cooling means disposed to receive the vulcanized material on leaving the vulcanization chamber for cooling the vulcanized material from the vulcanization temperature to ambient temperature.

6. A plant as claimed in claim 5, wherein said cooling means comprise means defining a circuit for a cooling agent to be force circulated therealong; said cooling circuit including a cooling chamber invaded at least partially by said cooling agent and through which said vulcanized material is advanced.

7. A plant as claimed in claim 6, wherein said cooling chamber communicates with said vulcanization chamber and said fluid pressure means.

8. A plant as claimed in claim 3, wherein said conduit has an arcuate axis, the concavity of which faces upwards; said inlet means and said outlet means being arranged higher than the upper boundary of the lowest section of said conduit.

9. A plant as claimed in claim 8, wherein said arcuate axis has the configuration of a portion of a catenary.

10. A plant as claimed in claim 8, wherein said arcuate axis has a U-shaped configuration.

11. A plant as claimed in claim 8, further comprising a container for the heat exchange liquid arranged beneath the vulcanization chamber and communicating therewith, said container being arranged to accommodate all the heat exchange liquid; and means positioned in said container to push said heat exchange liquid out from said container and into said vulcanization chamber so as to invade the same up to a level lower than said inlet means and said outlet means.

12. A plant as claimed in claim 1, further comprising a return conduit having its two opposite ends connected to the vulcanization chamber close to said inlet means and said outlet means respectively, a pump arranged in said return conduit, and a feeding conduit connecting an outlet of said pump to the vulcanization chamber at a point thereof arranged between the positions at which said ends of the return conduit are connected to the vulcanization chamber.

13. A plant as claimed in claim 12, wherein said feeding conduit is connected to the vulcanization chamber by means of an injection device for causing the heat exchange liquid to flow in a predetermined direction along the vulcanization chamber.

14. A plant as claimed in claim 13, wherein said injection device is arranged close to one end and is directed to cause the heat exchange liquid to flow towards the other end of the vulcanization chamber.

15. A plant as claimed in claim 13, wherein said injection device is tubular in shape to allow passage therethrough of the material to be vulcanized.

16. A plant as claimed in claim 13, wherein said injection device comprises a plurality of nozzles, the axes of which intersect each other at a single point.

17. A plant as claimed in claim 13, wherein said injection device comprises a hollow annular body disposed within the vulcanization chamber and defining therein an annular chamber communicating with the feeding conduit and communicating laterally with the vulcanization chamber through an annular slit tapered towards the vulcanization chamber and defined by coaxial annular frusto-conical surfaces.

18. A plant as claimed in claim 13, wherein said injection device comprises means defining an annular chamber disposed within the vulcanization chamber and communicating with the latter through an annular conduit shaped as a Venturi tube defined between an inner member and an outer member, the inner member of said Venturi tube being adjustable with respect to the outer member thereof to vary the size of said annular conduit.

19. A plant as claimed in claim 18, wherein said outer member has a frusto-conical interior surface and said inner member has a frusto-conical exterior surface co-axial with the frusto-conical interior surface of said outer member, said inner member being movable axially relative to said outer member.

20. A plant as claimed in claim 19, wherein said inner member is tubular.

21. A plant as claimed in claim 18, wherein said annular chamber is defined within a tubular casing having two end walls provided one with a threaded axial through hole and the other with a frusto-conical axial through hole tapered away from said one end wall, said inner member being an externally threaded tubular body extending in an axially adjustable manner through said threaded hole and having an end portion of frusto-conical shape, at least part of which extends within said axial frusto-conical through hole.

22. A plant as claimed in claim 18, wherein stabilizing means for the flow of the heat exchange liquid are provided within said annular chamber to cause said liquid to move axially along said Venturi tube.

23. A plant as claimed in claim 12, wherein said feeding conduit is connected to the vulcanization chamber by a plurality of nozzles spaced along said chamber in a direction of advancement of the material to be vulcanized.

24. A plant as claimed in claim 23, wherein said nozzles extend from an auxiliary conduit connected to said feeding conduit and extending along the vulcanization chamber parallel with the direction of advancement of the material to be vulcanized.

25. A plant as claimed in claim 24, wherein said auxiliary conduit is arranged outside the vulcanization chamber, and communicates with the latter through a plurality of holes formed through a sidewall of said auxiliary conduit and a wall of the vulcanization chamber, said holes defining said nozzles.

26. A plant as claimed in claim 23, wherein means for advancing and supporting the material to be vulcanized are provided within the vulcanization chamber to support said material in such a position as to allow the same to be struck by jets of heat exchange liquid issuing from said nozzles.

27. A plant as claimed in claim 26, wherein the advancement means comprise a belt conveyor.

* * * * *

REEXAMINATION CERTIFICATE (86th)

United States Patent [19]

Caser

[11] B1 4,029,450

[45] Certificate Issued May 24, 1983

[54] PLANT FOR VULCANIZING A CONTINUOUS LENGTH OF CURABLE MATERIAL ARTICLES OF ELASTOMERIC MATERIALS

[75] Inventor: Gustavo Caser, Gaglianico (Vercelli), Italy

[73] Assignee: Officine Termomeccaniche Successori Carello S.p.A., Gaglianico, Italy

Reexamination Request

No. 90/000,200, May 18, 1982

Reexamination Certificate for:
Patent No.: 4,029,450
Issued: Jun. 14, 1977
Appl. No.: 569,502
Filed: Apr. 18, 1975

[30] Foreign Application Priority Data

Apr. 26, 1974 Italy ............................. 68315/74

[51] Int. Cl.³ ............................. B29F 3/10
[52] U.S. Cl. ... 425/71; 264/347; 425/72 R; 425/113; 425/404; 425/445
[58] Field of Search ... 425/71, 445; 264/236, 347, 264/174

[56] References Cited

U.S. PATENT DOCUMENTS 1,661,888  3/1928  Fisher.
4,029,450  7/1977  Caser.

FOREIGN PATENT DOCUMENTS

| | | |
|---|---|---|
| 2239289 | | Fed. Rep. of Germany. |
| 843995 | | France. |
| 902095 | | France. |
| 1139085 | | France. |
| 48570 | | Japan. |
| 373374 | | Japan. |
| 46-13555 | | Japan. |
| 48-71487 | | Japan. |
| 48-79868 | | Japan. |
| 48-112863 | | Japan. |
| 49-38940 | | Japan. |
| 955908 | 4/1964 | United Kingdom. |
| 1072736 | | United Kingdom. |
| 1083895 | 9/1967 | United Kingdom. |
| 1137626 | 12/1968 | United Kingdom. |

*Primary Examiner*—J. R. Thurlow
*Attorney, Agent, or Firm*—Ladas & Parry

[57] ABSTRACT

A plant for carrying out a process of continuous vulcanization of articles of elastomeric material comprises a vulcanization apparatus comprising a circuit for a heat exchange liquid. The circuit comprises a vulcanization chamber arranged to receive the heat exchange liquid, means for heating the liquid to a predetermined temperature, and means for generating a predetermined pressure in the circuit. The circuit has at least one inlet and one outlet to allow passage of articles through the chamber, seals disposed at the inlet and outlet to ensure tightness of the passage of articles through the inlet and outlet and means to prevent contact between the seals and the high temperature liquid contained under pressure within the circuit.

REEXAMINATION CERTIFICATE ISSUED UNDER 35 U.S.C. 307.

THE PATENT IS HEREBY AMENDED AS INDICATED BELOW.

Matter enclosed in heavy brackets appeared in the patent, but has been deleted and is no longer a part of the patent; matter printed in italics indicates additions made to the patent.

AS A RESULT OF REEXAMINATION IT HAS BEEN DETERMINED THAT:

Claims 1, 4, 7, 11 and 14–18 are determined to be patentable as amended:

1. A plant for vulcanizing a continuous length of curable material, the plant comprising means defining a vulcanization chamber having a first region adapted to receive heat exchange liquid heated to a predetermined temperature and [at least one] *two* further [region] *regions* which [communicates] *communicate* with said first region but [is] *are* not invaded by said heat exchange liquid when said heat exchange liquid is received in said first region; [fluid] *gas* pressure means connected to said [at least one] further [region] *regions* to generate *pressure* in said vulcanization chamber [fluid pressure]; [and] inlet means and outlet means provided *before the* [at said at least one] *first* further region *and after the second further region* to allow passage of said material through said chamber in fluid tight manner, *a return conduit having two opposite ends connected to respective ends of the first region, a pump arranged in said return conduit, and a feeding conduit connecting an outlet of said pump at a point thereof arranged between the positions at which said ends of the return conduit are connected to the first region, said feeding conduit being connected to the first region by means of an injection device for causing heat exchange liquid to flow in a predetermined direction along and to flood the first region.*

4. A plant as claimed in claim 1, wherein said [fluid] *gas* pressure means are means operatively associated with said chamber for feeding a gas under pressure into said chamber.

7. A plant as claimed in claim 6, wherein said cooling chamber communicates with said vulcanization chamber and said *gas* [fluid] pressure means.

11. A plant as claimed in claim [8] *1*, further comprising a container for the heat exchange liquid arranged beneath the vulcanization chamber and communicating therewith, said container being arranged to accommodate all the heat exchange liquid; and means positioned in said container to push said heat exchange liquid out from said container and into said vulcanization *chamber*. [chamber so as to invade the same up to a level lower than said inlet means and said outlet means.]

14. A plant as claimed in claim [13] *1*, wherein said injection device is arranged close to one end *of the first region* and is directed to cause the heat exchange liquid to flow towards the other end of the *first region.* [vulcanization chamber.]

15. A plant as claimed in claim [13] *1*, wherein said injection device is tubular in shape to allow passage therethrough of the material to be vulcanized.

16. A plant as claimed in claim [13] *1*, wherein said injection device comprises a plurality of nozzels, the axes of which intersect each other at a single point.

17. A plant as claimed in claim [13] *1*, wherein said injection device comprises a hollow annular body disposed within the vulcanization chamber and defining therein an annular chamber communicating with the feeding conduit and communicating laterally with the vulcanization chamber through an annular slit tapered towards the vulcanization chamber and defined by coaxial annular frusto-conical surfaces.

18. A plant as claimed in claim [13] *1*, wherein said injection device comprises means defining an annular chamber disposed within the vulcanization chamber and communicating with the latter through an annular conduit shaped as a Venturi tube defined between an inner member and an outer member, the inner member of said Venturi tube being adjustable with respect to the outer member thereof to vary the size of said annular conduit.

Claims 2, 3, 5, 6, 8–10, 12, 13 and 19–27, dependent on amended claims, are determined to be patentable.

New claims 28–30 are added and determined to be patentable.

*28. A plant as claimed in claim 1 in which the vulcanizing chamber is substantially straight.*

*29. A plant as claimed in claim 1 in which the heat exchange liquid is comprised of a mixture of inorganic salts.*

*30. A plant as claimed in claim 1 wherein the injector comprises means for causing the heat exchange liquid to flow axially into the vulcanization chamber.*

* * * * *